US011944235B2

(12) United States Patent
de' Longhi et al.

(10) Patent No.: US 11,944,235 B2
(45) Date of Patent: Apr. 2, 2024

(54) AUTONOMOUS APPARATUS FOR COOKING FOOD, AND CORRESPONDING METHOD

(71) Applicant: DE'LONGHI APPLIANCES S.R.L. CON UNICO SOCIO, Treviso (IT)

(72) Inventors: Giuseppe de' Longhi, Treviso (IT); Gianpaolo Trevisan, San Martino Buon Albergo (IT)

(73) Assignee: DE'LONGHI APPLIANCES S.R.L. CON UNICO SOCIO, Treviso (IT)

(*) Notice: Subject to any disclaimer, the term of this patent is extended or adjusted under 35 U.S.C. 154(b) by 15 days.

(21) Appl. No.: 17/853,876

(22) Filed: Jun. 29, 2022

(65) Prior Publication Data
US 2022/0330749 A1  Oct. 20, 2022

Related U.S. Application Data

(63) Continuation of application No. 16/323,510, filed as application No. PCT/EP2017/069556 on Aug. 2, 2017, now abandoned.

(30) Foreign Application Priority Data

Aug. 5, 2016  (IT) .................. 102016000082900

(51) Int. Cl.
  *A47J 37/06*  (2006.01)
  *A47J 37/08*  (2006.01)
(52) U.S. Cl.
  CPC ....... *A47J 37/0641* (2013.01); *A47J 37/0842* (2013.01)

(58) Field of Classification Search
  CPC .................. A47J 37/0641; A47J 37/0842
  USPC .......................................... 219/400
  See application file for complete search history.

(56) References Cited

U.S. PATENT DOCUMENTS

| | | | | |
|---|---|---|---|---|
| 6,227,697 | B1* | 5/2001 | Stahl ................. | B01F 27/95 366/65 |
| 8,061,150 | B2* | 11/2011 | Kim ................. | F25C 1/18 62/449 |
| 2003/0160048 | A1* | 8/2003 | Chen ................. | A47J 36/027 219/726 |
| 2008/0163764 | A1* | 7/2008 | Payen ............... | A47J 37/043 99/447 |

(Continued)

FOREIGN PATENT DOCUMENTS

| | | | |
|---|---|---|---|
| CN | 202341751 | * | 7/2012 |
| WO | WO2014/068225 | * | 5/2014 |

(Continued)

*Primary Examiner* — Nathaniel E Wiehe
*Assistant Examiner* — Frederick F Calvetti
(74) *Attorney, Agent, or Firm* — MARSHALL, GERSTEIN & BORUN LLP

(57) ABSTRACT

An autonomous apparatus for cooking food includes a support body, an openable lid, an internal container which can be extracted/inserted with respect to said support body and open at the top, at least a heating device, and one or more elements to generate a flow of air toward the inside of said container. The air flow generator element is connected to a return exit with a suction mouth made in correspondence with an internal wall of said support body and cooperating with a plurality of through holes made on at least one portion of the lateral wall of the internal container.

8 Claims, 3 Drawing Sheets

(56) References Cited

U.S. PATENT DOCUMENTS

| | | | | |
|---|---|---|---|---|
| 2008/0213447 A1* | 9/2008 | Payen | .................. | A47J 37/0641 |
| | | | | 219/385 |
| 2008/0308545 A1* | 12/2008 | Kim | ....................... | F24C 15/18 |
| | | | | 219/400 |
| 2011/0048246 A1* | 3/2011 | Chang | ................... | A47J 27/004 |
| | | | | 99/348 |
| 2011/0126719 A1* | 6/2011 | Valance | .............. | B01F 27/0543 |
| | | | | 99/348 |
| 2011/0256285 A1* | 10/2011 | De' Longhi | ........ | A47J 37/0641 |
| | | | | 99/341 |
| 2013/0334350 A1* | 12/2013 | Wong | ...................... | A47J 43/24 |
| | | | | 241/101.8 |
| 2014/0318388 A1* | 10/2014 | Kim | .................... | A47J 37/0641 |
| | | | | 99/447 |
| 2015/0201806 A1* | 7/2015 | Yoshidome | ......... | A47J 37/0641 |
| | | | | 99/447 |
| 2020/0260909 A1* | 8/2020 | De' Longhi | .......... | A47J 43/046 |

FOREIGN PATENT DOCUMENTS

| | | | |
|---|---|---|---|
| WO | WO2014/174466 | * | 10/2014 |
| WO | WO2018/065424 | * | 4/2018 |

\* cited by examiner

AUTONOMOUS APPARATUS FOR COOKING FOOD, AND CORRESPONDING METHOD

FIELD OF THE INVENTION

The present invention concerns an autonomous apparatus for cooking food, comprising a support body, a lid and a container for the food that can be removed/inserted with respect to the support body.

The autonomous apparatus also comprises at least one heating device and at least one element able to generate a flow of air to the food.

BACKGROUND OF THE INVENTION

In the domestic environment, autonomous apparatuses for cooking food are known, comprising a support body and an internal container, selectively extractable and open at the top.

The apparatus is also provided with a lid, possibly part of or associable with the support body, which can be closed on the internal container to create a cooking compartment having a controlled atmosphere suitable for the cooking to be carried out.

Furthermore, at least one heat energy producing device is normally present, disposed at the bottom and/or top of the internal container, which usually cooperates with one or more elements suitable to generate a flow of heated air to the container, so as to provide the desired contribution of heat energy to the food.

For the purposes of obtaining a proper and homogenous cooking of the food, it is important that the flow of hot air takes a certain path; from a sending aperture, the flow of air must be distributed uniformly inside the container and between the food and then be removed through a return exit.

However, it often happens that, due to the conformation of the return exit and/or due to the position where it is installed, the flow of air is not taken to follow a path that passes correctly and uniformly through the food, and hence the heat inside the cooking compartment is not distributed homogeneously.

Furthermore, the return of the flow of air to the heating device in certain cases is difficult, because it is hampered by barriers and/or screens present along the path, which cause losses in the flow rate, despite the presence of elements to generate the flow of air.

Document US 2008/0163764 describes an autonomous apparatus for cooking food comprising a support body, a lid hinged to the support body and selectively openable, an internal container that can be removed from/inserted into the support body and is open at the top to accommodate the food, a heating element and an element to generate a flow of air toward the inside of the container. The autonomous apparatus is configured to channel the flow of air from the container to the heating device by means of a pipe made between an internal wall of the support body, conformed to accommodate the container, and the wall of the container. The document also describes a deflector screen to channel the air from the container toward the heating device. The screen is disposed between the wall of the container and the internal wall of the support body, or is defined by the external wall of the container. Consequently there are no annular pipes that are physically connected to the generator element, to direct the flow of air toward the heating device in an orderly and compartmentalized manner.

Document EP 3 009 054 describes an autonomous cooking apparatus that, like the one described in document US 2008/0163764, includes an exit aperture, lateral and upper with respect to the container, of the flow of air entering a cooking chamber. The flow of air exits from the cooking chamber though an air channel defined between the lower support body and the internal wall of the support body.

One purpose of the present invention is to obtain an autonomous apparatus for cooking food that allows to distribute the heat homogeneously inside the cooking compartment so as to make the heat contribution uniform to all the foods contained in the compartment itself.

Another purpose of the present invention is to obtain an autonomous apparatus for cooking food that optimizes the heat exchange, determining energy savings and allowing the optimum cooking of the food.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an autonomous apparatus for cooking food comprising a support body, a lid, an internal container open at the top and which can be extracted/inserted with respect to said support body, at least one heating device and at least one element to generate a flow of air toward the inside of said container.

The air flow generator element is connected to a return exit cooperating, when the lid is in the closed position on the container, with a peripheral edge of the container to remove the flow of air from the container and to channel it toward the heating device by means of an annular pipe.

According to one aspect of the present invention, the annular pipe has two ends, symmetrically connected to the at least one air flow generator element.

The annular pipe that picks up the air is therefore disposed around and outside the mouth of the food container, so that the air taken is distributed uniformly around the upper edge of the container.

In particular, the flow of air exiting from the container is sucked from the return exit, determining a closed circuit to recirculate the flow of air.

The present invention also concerns a method to return a flow of heat conditioned air inside an autonomous apparatus for cooking food, which uses the return aperture made on an upper edge of the support body.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
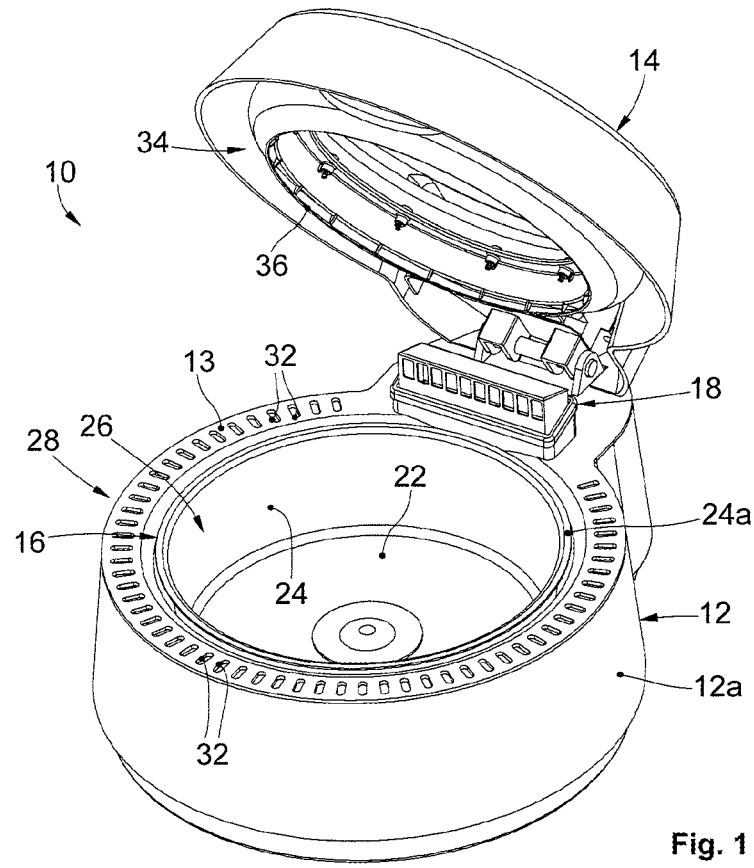
FIG. 1 is a perspective view of an autonomous apparatus for cooking food.

Embodiments described here in FIGS. 1-5 refer to an autonomous apparatus 10 for cooking foods, able to perform various cooking modes, such as stewing, brazing, boiling, roasting, frying, simple heating, sautéing, browning, slow cooking, or quick cooking in general.

The autonomous apparatus 10 comprises a support body 12, with which is associated an openable lid 14, an extractable/insertable internal container 16, open at the top and defining a cooking compartment 26 for food, at least one heating device 18 and at least one air flow generator element 20.

The support body 12 has an external wall 12a and an internal wall 12b, adjacent during use to the container 16. Between the external wall 12a and the internal wall 12b there is an interspace 15 which can function as a technical compartment.

The support body 12 has an upper edge 13 which cooperates at least partly with a lower edge of the lid 14 when the latter is closed to cover the container 16.

The presence of the lid 14 is functional to create a controlled environment and conditions necessary for cooking the food.

The lid 14 can be made of the same material as the support body 12, or of a different material.

Advantageously, at least the lid 14 can be made of at least partly transparent material, to allow the user to view and thus control the cooking.

For example, the lid 14 can be made of a polymer or glass material.

The container 16 is defined by a base wall 22, which in this non-restrictive case is substantially circular, and by a lateral wall 24 connected to the base wall 22 and having a peripheral edge 24a.

The container 16 is configured to allow the association of one or more grips to allow to handle the container 16.

The base wall 22 can have a surface made with a plurality of configurations, for example conical, or hump-backed, more or less accentuated.

In a preferred embodiment, to which reference will be made hereafter, the base wall 22 has a substantially flat configuration.

The container 16 is open at the top to introduce food inside it and to allow the circulation of the flow of air from the heating device 18 to the food.

According to one aspect of the present invention, the generator element 20 is connected to a return exit 28 which, when the lid is in the closed position on the container, cooperates with the peripheral edge 24a of the container 16.

The return exit 28 is configured to extract the flow of air immediately exiting from the container 16 and to channel it to the heating device 18 by means of an annular pipe 30.

According to one aspect of the present invention, the annular pipe 30 has ends that are symmetrically connected to the generator element 20.

In this way, advantageously, the air flow is conveyed and divided symmetrically along the annular pipe 30 to converge toward the generator element 20.

Figure 2:
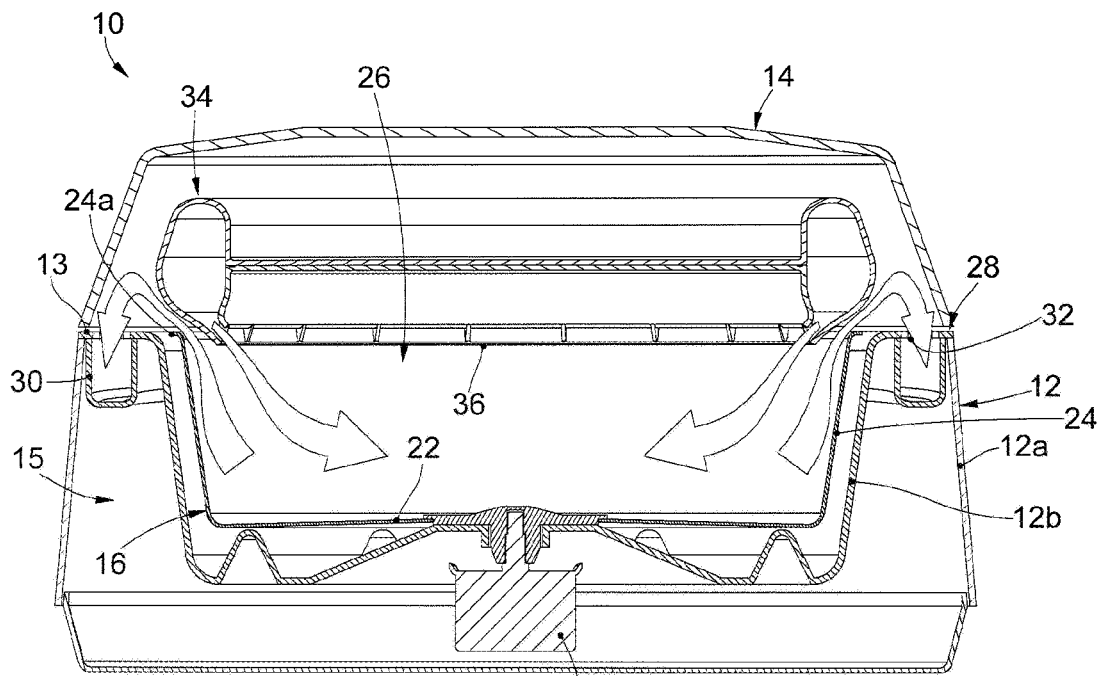
FIG. 2 is a section view of the autonomous apparatus in FIG. 1.
Figure 3:
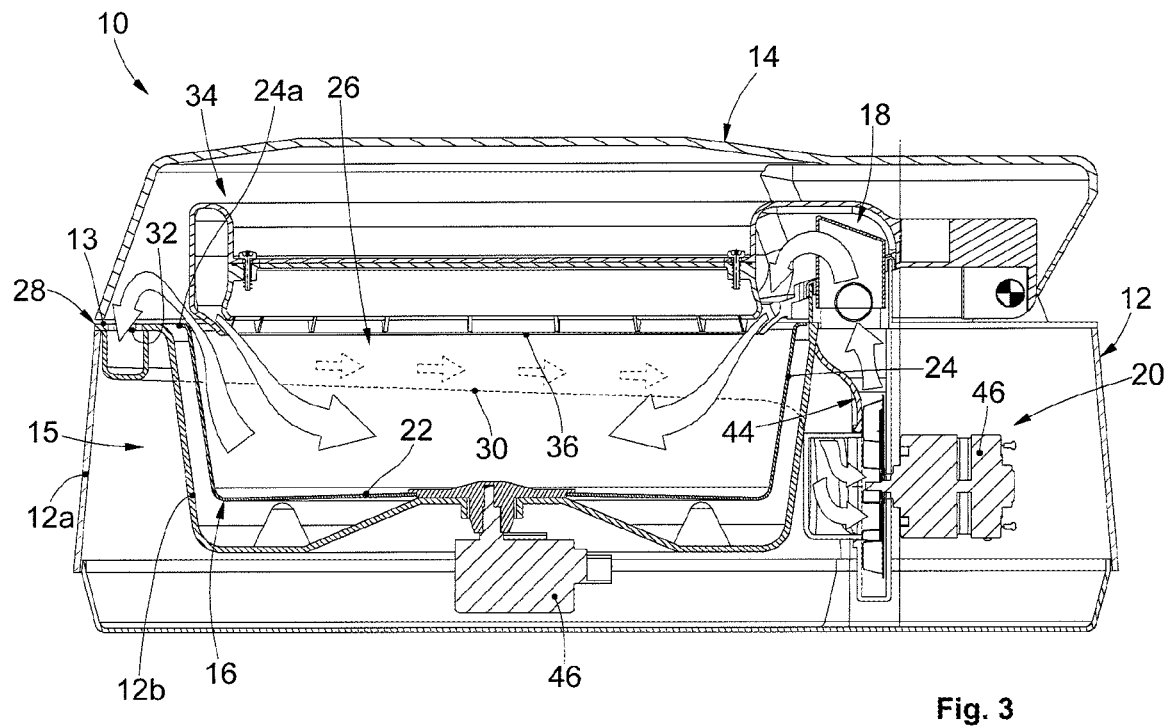
FIG. 3 is another section view of the autonomous apparatus in FIG. 1.

According to one embodiment, shown by way of example in FIGS. 2 and 3, the annular pipe 30 is installed between the support body 12 and the container 16.

For example, the annular pipe 30 is installed in the interspace 15.

Advantageously, the annular pipe 30 encloses a space and channels the flow of air in a univocal manner, determining its closed circuit path.

In this particular embodiment, the annular pipe 30 has a plurality of slits 32 disposed along the development of the annular pipe 30 and disposed in correspondence with the upper edge 13 of the support body 12.

The annular pipe 30 develops for the entire circumference of the cooking apparatus 10 and has at least one end connected to the generator element 20.

The lid 14 advantageously has a hollow internal surface in correspondence with the plurality of slits 32.

According to one formulation of the present invention, the generator element 20 cooperates with a sending aperture 34 to send the flow of air, provided on the lid 14.

According to one embodiment of the present invention, which is shown by way of example in FIGS. 1-3 and 5, the sending aperture 34 can have a substantially hollow toroidal shape which cooperates, when the lid 14 is closed on the container 16, with the peripheral edge 24a of the container 16.

The sending aperture 34 can have a circumferential slit 36 that allows the flow of air circulating in the toroidal cavity to escape from it, to be directed, when the lid 14 is at least partly closed, to the container 16.

In the case where there is the sending aperture 34 with a toroidal or substantially circular development, it develops on a circumference with a smaller diameter than the peripheral edge 24a of the container 16, to allow to discharge the flow of air from the container 16 to the return exit 28.

In this way, the sending aperture 34 does not abut against the circumferential edge 24a, thus creating a gap that allows to discharge the flow of air from the container 16 to the sending exit 28.

According to another embodiment, the sending aperture 34 can have a limited development and in proximity to the heating device 18.

The autonomous apparatus 10 comprises a recirculation pipe 44 which determines the connection between the generator element 20 and the heating device 18, in practice connecting the return exit 28 to the sending aperture 34.

Figure 4:
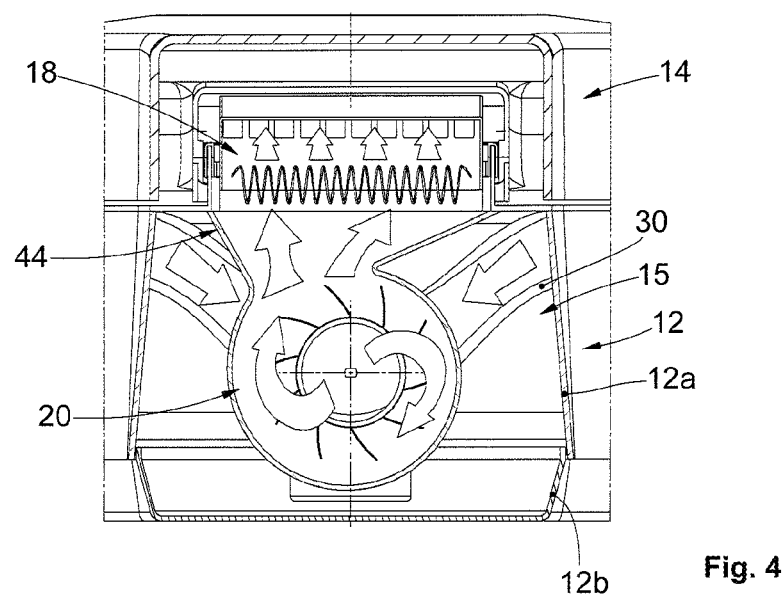
FIG. 4 is a detail of a section view of the autonomous apparatus in FIG. 1.

According to embodiments described here, the recirculating pipe 44 can be configured to determine the continuation of the annular pipe 30 (FIG. 4).

The generator element 20 can be installed at any point whatsoever inside the interspace 15 provided that it allows to recirculate the flow of air.

The generator element 20 can be, for example, an axial, centrifugal or mixed axial/centrifugal fan, made to rotate by a drive member 46.

Figure 5:
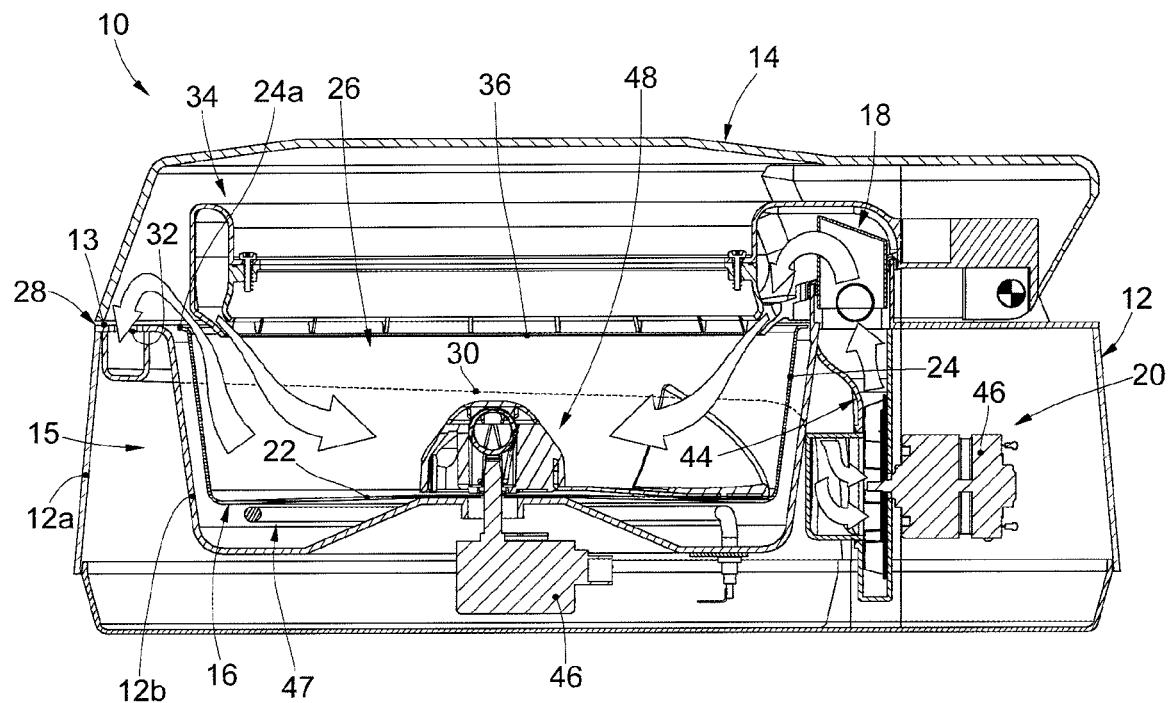
FIG. 5 is section view of the autonomous apparatus in one embodiment.

According to one embodiment, shown by way of example in FIG. 5, the autonomous apparatus 10 can comprise an additional auxiliary heating device 47, or alternative to the heating device 18, for example installed in proximity to the base wall 22.

According to embodiments described here, the container 16 can be rotated around an axis of rotation, preferably in relation to the center of the base wall 22, by means of an additional drive member 46.

According to other embodiments described here, the autonomous apparatus 10 can comprise a mixing device 48 which is provided with at least one mixing blade, rotating with respect to the container 16 (FIG. 5).

It is clear that modifications and/or additions of parts may be made to the autonomous apparatus 10 and corresponding method as described heretofore, without departing from the field and scope of the present invention.

It is also clear that, although the present invention has been described with reference to some specific examples, a person of skill in the art shall certainly be able to achieve many other equivalent forms of autonomous apparatus 10 and corresponding method, having the characteristics as set forth in the claims and hence all coming within the field of protection defined thereby.

The invention claimed is:

1. An autonomous apparatus for cooking food comprising:
a support body, an openable lid, an internal container which can be extracted/inserted with respect to said support body, the internal container being open at the top, at least one heating device and at least one air flow generator element to generate a flow of air toward the inside of said container, said at least one air flow generator element being connected to a return exit, the return exit cooperating, when said lid is in the closed position on said container, with a peripheral edge of said container to remove said flow of air from said container and to channel the flow of air toward said at least one heating device via an annular pipe, and wherein the annular pipe has two ends symmetrically connected to said at least one air flow generator element.

2. The autonomous apparatus as in claim 1, wherein said annular pipe has a plurality of fissures disposed along a length of the annular pipe and corresponding with an upper edge of said support body.

3. The autonomous apparatus as in claim 2, wherein the openable lid includes a sending aperture with a substantially hollow toroidal shape cooperating with a peripheral edge of the container.

4. The autonomous apparatus as in claim 3, wherein said sending aperture has a circumferential slit configured to allow said flow of air to exit from the cavity of said sending aperture and to position itself with said openable lid at least partly closed in said container.

5. The autonomous apparatus as in claim 3, wherein said sending aperture develops on a lower circumference with respect to said peripheral edge to determine a discharge of said flow of air from said container toward said return exit.

6. The autonomous apparatus as in claim 1, wherein said container is rotatable around an axis of rotation by a drive member.

7. The autonomous apparatus as in claim 1, wherein the apparatus further comprises a mixing device provided with at least one mixing blade arranged rotating with respect to said container.

8. A method to return a flow of air inside an autonomous apparatus for cooking food, the apparatus comprising a support body, an openable lid, an internal container which can be extracted/inserted with respect to said support body and open at the top, at least one heating device and at least one element to generate a flow of air toward the inside of said container, the method comprising:
heating a flow of air using the at least one heating device;
removing a flow of used air from said container through a return exit cooperating, when said lid is in the closed position on said container, with a peripheral edge of said container;
channeling said flow of air toward said at least one heating device by means of an annular pipe in order to define a closed circuit travel of said flow of air;
providing said the annular pipe with two ends symmetrically connected to said at least one air flow generator element.

* * * * *